Figure 1:
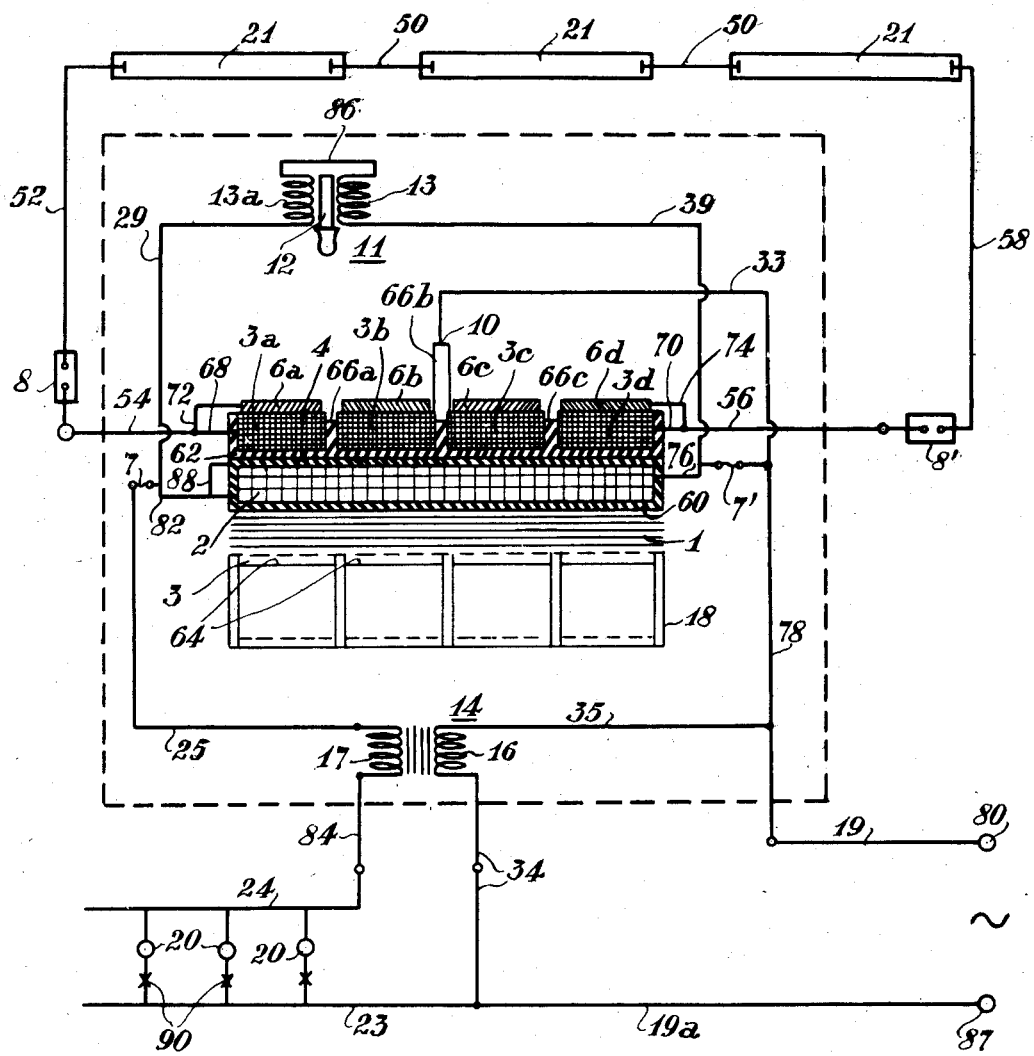

Patented June 1, 1943

2,320,537

UNITED STATES PATENT OFFICE 2,320,537

CIRCUIT FOR CORRECTING PHASE DISPLACEMENT

Evaristo Santos, Avellaneda, Argentina

Application July 16, 1941, Serial No. 402,633
In Argentina July 18, 1940

3 Claims. (Cl. 176—124)

The present invention relates to electric circuits and more particularly to circuits including an electric gas discharge lamp such as a neon tube.

As is well known, in practice it is necessary to include in the lighting circuit of electric gas discharge tubes, a transformer in order to provide the required high tension. The known transformers give rise to considerable phase displacement because of their high inductive value, and an impedance proportionate to the length of the tubes in relation to their ohmic value. If the impedance is not adjusted to the length of the tube, the useful output of the magnetic field of the transformer will be decreased and will cause a drop of voltage in the tubes, the output of which will therefore not be adjusted to the E. M. F. of said impedance. The ratio of the inductive field and the impedance to the ohmic resistance of the conductors of the transformer, would be equal to the secant of the angle of magnetic inertia, so that the transformer must work under phase displacement conditions in order to maintain the normal voltage in the gaseous discharge tubes. It is understood that the gaseous discharge tubes owing to their characteristics and the phenomena produced therewithin will be rectifiers of the alternating current.

For the purpose of clearly understanding the present invention, the fundamental principles concerning induced currents and variations of magnetic flux must be borne in mind, and it should be remembered that every induced current of increasing intensity produces in a neighbouring circuit an induced current flowing in the opposite direction to that of the inducing current; every induced current of diminishing intensity produces in a closed circuit an induced current flowing in the same direction as the inducing current, and every induced current acts as a growing current for the circuit of the gaseous discharge tubes. The variation of the magnetic flux passing through a closed circuit, develops in said circuit an induced ohmic resistance, and the duration of the induced current is equal to the variations of the flux. The property of induced currents first mentioned is used for the purposes of the voltage booster, and the second for the purposes of the transformer, whereas the characteristics of the reaction of magnetic flux are utilized for the effects of the incandescent lamps which constitute ohmic resistances.

If, in an alternating current circuit, phase displacement occurs, this represents a loss, since the apparent power may be divided into a useful component and an idle component, the latter being unable to develop any electromotive work whatever. Hence the suppression of phase displacement in such a circuit will represent an important advantage, provided that it can be achieved without interfering with the operation of the component parts of the circuit. Although it is true that a transformer having one of its windings superimposed on the other can work without phase displacement, it has been found that in the standard circuits usually used for gaseous discharge tubes, it is impossible to use such transformers without encountering difficulties as regards the starting and operation of such tubes.

It has, however, been found possible to provide an operating circuit for such tubes, which is substantially free of phase displacement. According to the present invention, said circuit comprises a transformer with superimposed windings, across the secondary of which are connected a plurality of gaseous discharge tubes in series, whereas one end of the primary is connected to one pole of a supply line, and the other end of the primary is connected to one side of a load line through one winding of a voltage boosting device, the other winding of which is connected at one end to a point between the first mentioned end of the primary and the corresponding pole of the supply, and at the other end, to a point between the other pole of the supply and the other side of the load line, a compensating device having two series of connected windings, being connected across the primary, said primary and secondary being protected each by metallic shields having a longitudinal slit.

Figure 2:
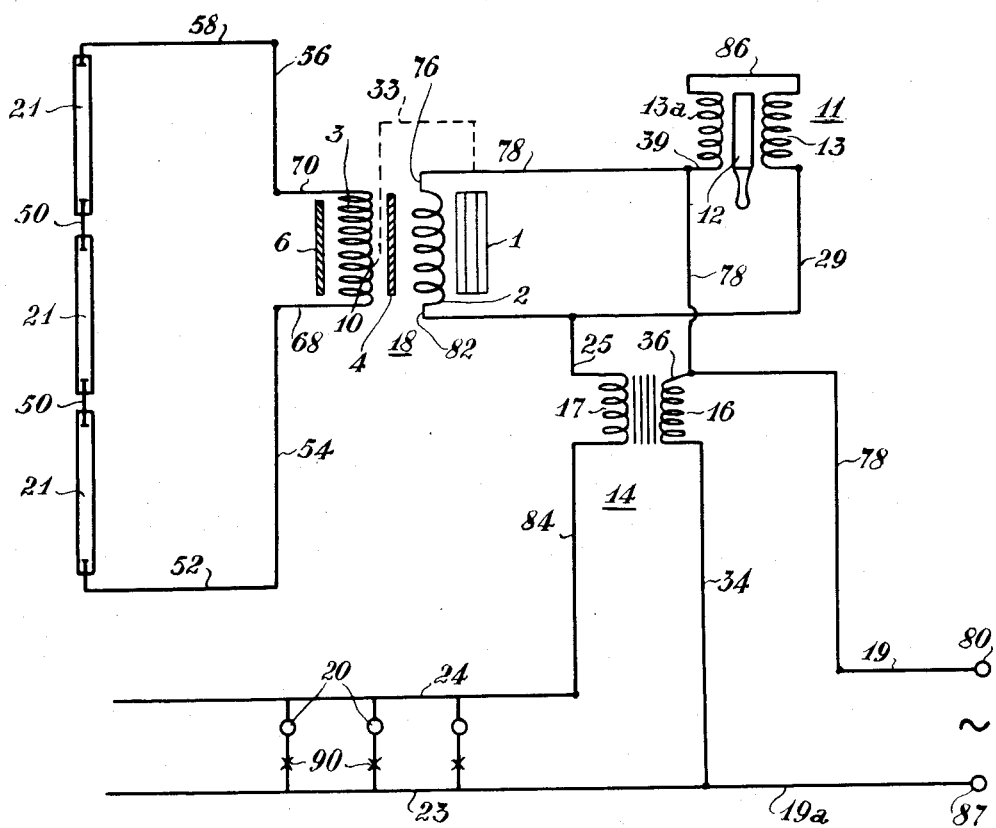

For a better understanding of the present invention and of the manner in which it is to be performed, a preferred embodiment will now be described with reference to the accompanying drawings, in which:

Fig. 1 is a diagram of a circuit including discharge tubes and a group of parallel connected lamps, showing diagrammatically the construction of the transformer and the relative arrangement of the parts, and Fig. 2 is a somewhat simplified connection diagram.

As seen from the drawings, a group of gaseous discharge tubes 21 connected in series by conductors 50, are connected across the secondary 3 of a transformer 18 by conductors 52, 54, 56 and 58, lightning arresters 8 and 8' being interposed between the ends of the secondary 3 and the ends of the series connected tubes 21.

The transformer 18 comprises a core 1, on which is located a primary winding 2, separated from said core by ordinary insulation 60, said primary being partially enclosed in a metallic sheath or shield 4, of tubular shape split lengthwise to provide a gap. Over the primary 2 are located a plurality of sections 3a, 3b, 3c, and 3d constituting a secondary 3, and insulated from said sheath 4 by insulation 62. Externally said sections are protected by individual sheaths 6a, 6b, 6c and 6d, which like the sheath 4, have slits 64 to provide gaps. The said secondary sections are connected in series by means of the bridges 66a, 66b, 66c and the ends 68, 70 of the secondary are connected to conductors 54 and 56 respectively and to shields 6a and 6d of the first and last sections by conductors 72 and 74 respectively. One end 76 of the primary is connected through a fuse 7' and by conductors 78 and 19, to one pole 80 of the supply line. The other end 82 of the primary is connected through a fuse 7 and conductor 25 to one winding 17 of a voltage booster 14, and the other end of said winding 17 is connected by conductor 84 to a load line 24. The end 76 of the primary is likewise connected to a coil 13a of a compensator 11 provided with an adjustable core 12. The other end of the coil 13a is connected in series by conductor 86 to a second coil 13 of the compensator, the other end of said second coil 13 being connected to the other end 82 of the primary by conductor 29. The second winding 16 of the booster 14, is connected at one end by conductor 35 to a point between the end 76 of the primary and the supply line terminal 80, and the other end of said second winding 16 is connected by conductor 34 to a point between supply line 19a which runs from the second supply terminal 87, to the second side 23 of the load line. The sheath 4 associated with the primary 2 is connected to end 82 of the latter by conductor 88. The mid-point 10 of the secondary is connected by conductor 33 to a point between fuse 7' and the first mentioned supply terminal 80. The load across conductors 24 and 23 consists of a plurality of glow lamps 20 the local circuit of which includes switches 90, said lamps being in parallel across said conductors 23 and 24.

The load line 23, 24, since the load consists of lighting lamps, is subject to variations corresponding to the lighting demand, that is, to the switching on and off of the lamps 20. The current circulating, not only in the primary of the transformer but also in the compensator 11, which is in parallel with the primary 2, will therefore be subject to similar variations. As the current flowing through the compensator diminishes, in obedience to Lenz's law, a tension will be created between its terminals which will tend to oppose the reduction of the current. This tension, because compensator 11 is in parallel with the primary 2, is thus applied to said primary reinforcing thus the tension between the terminals under normal running conditions. In order that this created tension shall be adequate, it is sufficient to adjust the inductance of the compensator 11 by inserting or withdrawing to a greater or less extent the adjustable core 12, with respect to the spool thereof.

When the lamps in the load circuit 23, 24 are lighted, the inductive resistance of the primary 2 increases, thus inducing a current in the secondary 3, which causes a voltage drop of the same inductive value for the gaseous discharge tubes 21. In order to restore this drop in tension to the circuit of the lamps 20, the booster 14 which is in series with conductor 24 and the primary 2 through its winding 17, restores the inductive loss of the primary 2 because the winding 16 of the booster is in parallel with a supply line 19, 19a, the inductive value of the winding 16 being inverse to that of the primary 2 of the transformer 18.

From the foregoing it will be seen that the system of the present invention always maintains compensated the current supplied to the discharge tubes 21, whatever may be the ohmic variation represented by the lamps 20. Thus it is possible to combine with a circuit comprising gaseous discharge tubes one including glow lamps having an ohmic resistance, with a consequent reduction to a minimum of the phase displacement which would otherwise be produced.

If one or more of the tubes breaks or becomes disconnected, a voltage surge will occur in the secondary 3, which would cause an arc to form, and for the purpose of localising the arc the lightning arresters 8, 8' and the fuses 7, 7' are provided, the latter melting on the production of the arc and thus interrupting the circuit of the primary 2. In such event, the lamps 20 can be supplied directly until the defect is repaired.

The split sheaths 4 and 6 are applied to offset the harmful effects of the internal static phenomena of the transformer 18. Since the intensity of the electrostatic component of the electric field of the transformer is a function of the potential of the conductor, it may happen that its geometric dimensions are such that the superficial electrostatic tension or disruptive potential is higher in some points than in others especially if the circuit includes a magnetising field of constant value. In these circumstances, the possibility of formation of disruptive arcs is favoured owing to the very high tension of the secondary of the transformer designed to operate the discharge tubes. The metallic sheaths 4 and 6 act as levelling screens to counteract the disruptive effects of the want of uniformity in the distribution of the electrostatic tension.

It is understood that in carrying the invention into practice, many modifications in the construction and arrangement of the circuit may be made, such as increasing or diminishing the number of its inductive fields, compensators, boosters and fuses, without, however, thereby departing from the spirit and scope thereof as defined in the accompanying claims.

I claim:

1. A circuit for correcting phase displacement, comprising in combination a plurality of gaseous discharge tubes connected in series; a load line comprising a pair of wires across which a load is connected; a transformer comprising a primary winding and a secondary winding superimposed on the primary winding, the ends of which secondary winding are connected with the ends of the series of discharge tubes; a voltage boosting device comprising two windings; and a compensating device comprising an adjustable core and two coils arranged around said core and connected in series; one end of the primary transformer winding being connected directly to a first wire of a supply line and being also connected through a first one of the windings of the voltage boosting device to a second wire of a supply line, the other end of the primary transformer being connected through a second one of the windings of the voltage boosting device to one of the load line wires, the other wire of which load line is connected to the mentioned second supply line wire, and the ends of the series of coils of the compensating device being connected across the said primary transformer winding.

2. A circuit for correcting phase displacement comprising in combination a plurality of gaseous discharge tubes connected in series; a load line including a pair of wires across which a load is connected, the said load line being adapted to be supplied from an alternating current power supply line; a transformer having a primary winding, a longitudinally split metallic sheath surrounding said primary winding, a secondary winding superimposed on said primary winding outside said sheath, a metallic sheathing having a longitudinal slit and surrounding said secondary winding, the ends of the secondary winding being connected to the ends of the series of discharge tubes, and one end of the said primary winding being connected to a first conductor of such an alternating current power supply line; a voltage boosting device comprising a first winding connected across said first conductor and a second conductor of such a power supply line, and a second winding connected at one end to one of the wires of the load line, the other wire of the latter being connected to the said second conductor of the power supply line, and the other end of said second winding of the voltage boosting device being connected to the other end of the primary winding of the transformer; and a compensating device comprising an adjustable metallic core and two coils disposed about said core and connected in series across the primary of the transformer.

3. A circuit for correcting phase displacement according to claim 2, in which the secondary of the transformer is subdivided into a plurality of sections connected in series and the mid-point of said secondary is connected to the first mentioned end of the primary.

EVARISTO SANTOS.